March 22, 1966 — W. G. WHITEHOUSE — 3,241,600
RECOVERY OF RUBBERY POLYMER FROM SOLUTION
Filed June 3, 1963
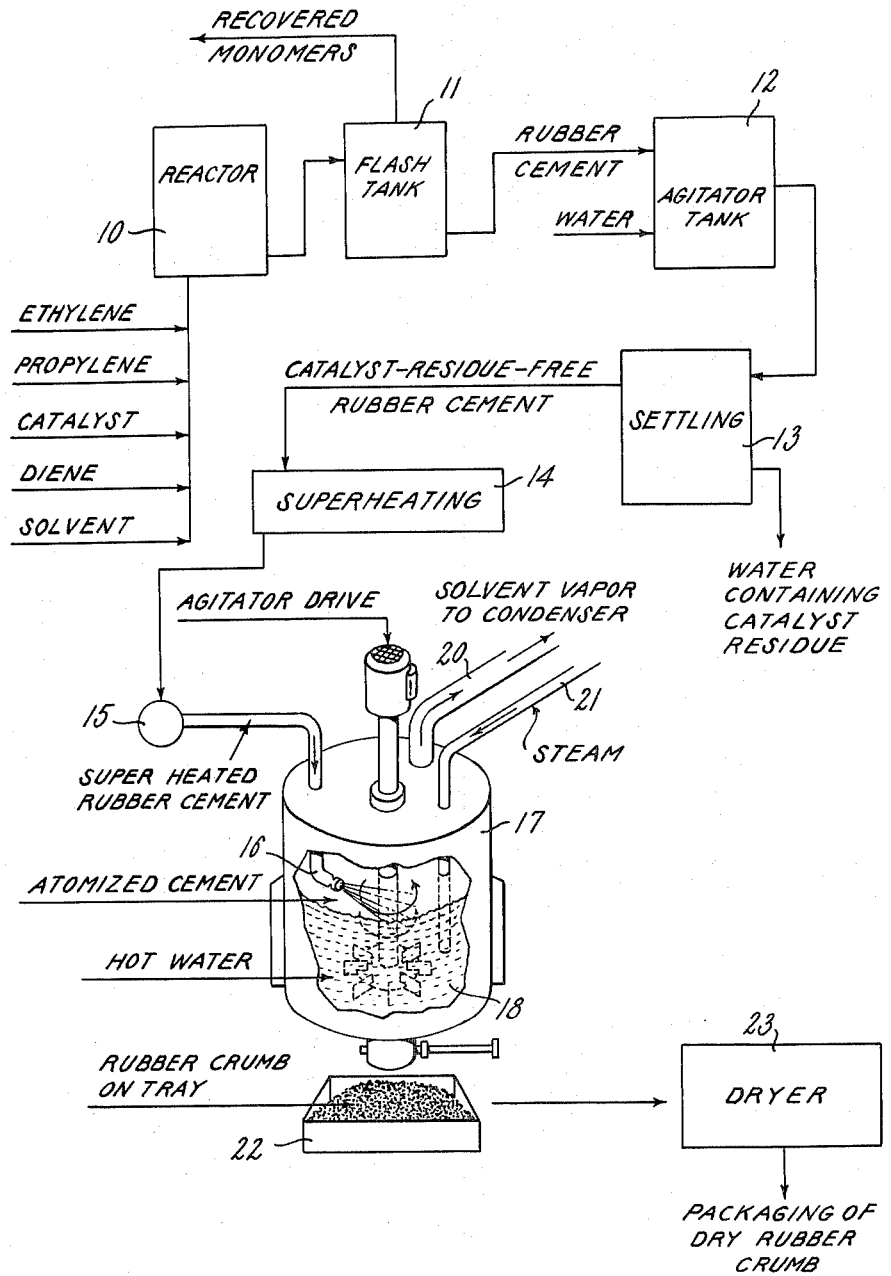
INVENTOR.
WENDELL G. WHITEHOUSE
BY James J. Long
AGENT

United States Patent Office 3,241,600
Patented Mar. 22, 1966

3,241,600
RECOVERY OF RUBBERY POLYMER FROM SOLUTION
Wendell G. Whitehouse, Oakville, Conn., assignor to United States Rubber Company, New York, N.Y., a corporation of New Jersey
Filed June 3, 1963, Ser. No. 285,450
4 Claims. (Cl. 159—48)

This invention relates to a method of recovery of elastomers, prepared in solution by coordination catalysts, or "Ziegler-type" catalysts, from the solution in which the elastomer is prepared.

In the accompanying drawing, the single figure is a flow sheet representing diagrammatically one embodiment of the invention.

The elastomers to which the present invention applies are such solution-prepared diolefin rubbers as cis-polyisoprene, cis-polybutadiene, styrene-butadiene rubbery copolymers, and monoolefin copolymer rubbers such as ethylene-propylene rubbery interpolymers (in which category I include unsaturated, sulfur-vulcanizable interpolymers of ethylene and propylene with small amounts of copolymerizable diene). Specifically, the invention is concerned with such elastomers as prepared in a solvent, including such inert solvents as hydrocarbon solvents having from 3 to 7 carbon atoms, including all the alkanes between propane and heptane, more specifically n-pentane, iso-pentane, n-hexane (including commercially available mixtures based mainly on such alkanes, such as "Skellysolve B," which is largely hexane), and also cycloaliphatic solvents such as cyclopentane and cyclohexane, as well as the aromatic solvents such as benzene and toluene; there may also be used such chlorinated hydrocarbon solvents as chlorobenzene or tetrachloroethylene, and in some cases an excess of one of the monomers may serve as the solvent. Usually the solvent has a boiling point from about 30° to about 275° F., preferably 100 to 200° F. Methods of preparing the described elastomers in solutions in such solvents, with the aid of various coordination catalysts, or Ziegler-type catalysts, which are usually stereo-specific catalysts and which may be either heterogeneous or soluble, are well-known, and the exact details of the polymerization as such do not constitute the novel feature of the present invention.

The solution of elastomeric polymer resulting from such a process is usually called a cement, and is a most unusual material that presents an unprecedented problem, from the standpoint of recovering the elastomer from the solution. In the first place the elastomeric polymer solution is extremely viscous and sticky and hard to handle, having a viscosity of the order of hundreds of thousands of centipoises at room temperature. The amorphous, rubbery polymer has almost infinite solubility in the solvents and is not readily precipitated from the solution by lowering the temperature of the solution. Ethylene-propylene-diene interpolymer rubber, for example, has such a strong affinity for solvents that a special problem arises in removing the solvent. If an attempt is made to remove solvent by stirring in hot water, the cement collects around the agitator and it is virtually impossible to remove the solvent from the center of the mass. If the cement is piped sub-surface into agitated hot water, the particles initially formed coalesce as the concentration increases and again it is impossible to remove the last traces of solvent from the center of the relatively large masses. In accordance with the invention, it has been found that it is possible to spray the superheated cement above a tank of agitated hot water in such a way that most of the solvent is removed from the spray droplets before they hit the water. The last traces of solvent are removed very quickly from the small droplets before they coalesce to large masses. Thereafter, there is no further tendency to coalesce and the resulting rubber crumb can be handled in a conventional fashion. This is in contrast to prior art processes dealing with crystallizable thermoplastics which form hard, dry, solid particles at room temperature. The present invention, in contrast, deals with an uncured rubber which is tacky, especially when it still contains some solvent. This fundamental difference will be appreciated by considering what happens when hydrocarbon oils (solvent) are added to the solid rubber. Such oils can be added to any extent without ever going through a two-phase system. As the oil is added, the viscosity drops steadily until a fluid state is reached. At infinite dilution the properties of the solution approach those of an oil. Nothing like this happens with polymers having thermoplastic properties. This presents real problems in isolation of the rubbery polymer. Thus, if we were to flash off the solvent and let the particles fall to the bottom of the chamber, the particles would form one essentially continuous mass. This would be impossible to handle. Likewise, if the spray droplets hit the sides of the chamber the walls would soon be lined with rubber. No such problems are involved in recovering thermoplastics.

In accordance with the present invention, it has now been found that the difficulties encountered in prior methods can be overcome in an effective and efficient manner, by pre-heating the solution of the elastomeric polymer in the described solvents to a temperature above the boiling point of the solvent (usually at least 3° to 50° F., and preferably 15° to 50° F., higher than the boiling point of the solvent), while maintaining it under sufficient pressure (usually a pressure of from 10 to 150 lbs. per square inch gauge) to keep the solvent in a liquid condition, passing the thus-superheated and pressurized solution of the elastomeric polymer through an atomizing nozzle from which the solution emerges as an extremely finely divided spray into a chamber maintained at a lower pressure than the superheated solution, typically maintained at substantially atmospheric pressure, with the result that the bulk of the solvent immediately flashes off, leaving the particles of solid, tacky, elastomeric polymer behind. The small particles still contain a certain amount of solvent and for this reason they are sufficiently tacky so that they normally have a tendency to stick together.

In accordance with the invention the described spraying operation is carried out above the surface of water maintained at an elevated temperature, typically equal to or in excess of, preferably at least 3° to 50° F. in excess of, the boiling point of the solvent. However, the temperature of the water is preferably at least about 10° F. below the boiling point of water. The water is kept rapidly agitated. The tacky particles, still containing some solvent, fall into the water and a certain amount of agglomeration of the fine particles takes place, forming somewhat larger crumbs (e.g., ¼ to ½ inch in diameter) which are porous and remain in the form of a slurry as long as the water is agitated. In this agitated hot water the remainder of the solvent is driven out of the particles. The final porous particles of essentially solvent-free rubber contain about 30–70% of water occluded throughout the particles. This is subsequently removed for example, by filtering, with the aid of any conventional device, such as a vibrating screen. The rubber is finally dried by conventional means, for example, in an oven, tunnel dryer, or it may be dried in a Banbury mixer especially adapted for that purpose, in a twin-screw extruder, or any other type of dewatering device.

It is desired to point out that the cement resulting from the solution polymerization process contains catalyst residues which must be removed prior to the described spraying operation. For example, in the manufacture of ethylene-propylene rubber or ethylene-propylene-copolymerizable diene rubber by solution polymerization, an important coordination catalyst employed is the soluble catalyst based on an alkyl aluminum halide and a vanadium salt. It is very important that contamination of the rubber with vanadium residues be kept to a very low level (less than 50 parts per million of vanadium). This is accomplished by bringing the cement together with a quantity of water and agitating the two. The water phase extracts the water-soluble catalyst residue from the separate cement phase, in which the polymer remains dissolved. When agitation is stopped, the mix separates into two layers; the aqueous phase containing the dissolved catalyst residue is withdrawn while the cement phase containing the now essentially catalyst residue free dissolved rubber is passed on to the superheating stage preparatory to spraying over water as previously described.

Prior to the solvent flashing step, small amounts of one or more stabilizers and/or antioxidants may be added, e.g., 1% of tris(nonylphenyl) phosphite ("Polygard" ®), may be added to the cement.

If desired, other ingredients may be added to the cement, such as oil extenders, including solid or liquid asphalt or the like (in amount of, for example, from 10 parts or less to 100 parts or more per 100 parts of rubber). Similarly, carbon black and/or other fillers may be added to the cement (suitably after wetting the filler, for example with some of the solvent or with some oil).

It may be mentioned that particularly important catalysts employed in preparing rubbery polymers of the kind to which the present invention applies are those formed by the interaction of a vanadium salt such as vanadium trichloride, vanadium tetrachloride, vanadium tetrabromide, vanadium oxytrichloride, or similar vanadium halides or oxyhalides, alkyl vanadates (especially where the alkyl group contains 1–12 carbon atoms, e.g., butyl vanadate), pervanadyl or vanadium acetylacetonate, and the like, including such compounds as dialkyl halovanadates and alkyl dihalovanadates, as in dibutyl chlorovanadate and dichlorobutylvanadate, with (2) an organo metallic compound of the type represented by the formulas (a) RMgX (Grignard reagent) where R is a hydrocarbon radical having for example from 1 to 12 carbon atoms for example an alkyl radical such as methyl, ethyl, etc., or an aryl radical such as phenyl, naphthyl, etc., and X is a halogen atom; (b) LiAlR$_4$ where R is as previously defined; (c) R$_A$Al$_B$X$_C$ where R and X are as previously defined, A is a number from 1 to 3, B is one of the integers 1 and 2, C is a number from zero to 3, and $$\frac{A+C}{3} = B$$

The diclosures of Schreyer U.S. Patent 2,962,451 and Ziegler Belgian Patent 553,655, are hereby incorporated herein by references as describing in more detail catalyst systems of the foregoing kind useful for preparing rubbery polymers which are recovered from solution by the method of the present invention. Preferred catalysts are the soluble catalyst of the kind described in British Patent 886,368, based on vanadium oxytrichloride or the like and alkyl aluminum sesquichloride, or mixed alkyl aluminum halides containing a substantial proportion of the sesquichloride.

A preferred form of the invention is directed to the recovery of unsaturated, sulfur-vulcanizable, rubbery terpolymers of ethylene and propylene and a copolymerizable diene such as dicyclopentadiene, methyl cyclopentadiene dimer, 1,4-hexadiene, 11-ethyl-1,11-tridecadiene, 1,9-octadecadiene, or other suitable dienes such as are disclosed in British Patent 880,904 of Dunlop Rubber Co., October 25, 1965 or U.S. Patents 2,933,480, Gresham and Hunt, April 19, 1960 and 3,000,866, Tarney, September 19, 1961, the disclosures of which are hereby incorporated herein by reference. Preferred terpolymers contain from about 1 to about 25% (more perferably about 2 to about 15%) by weight of dicyclopentadiene or the like; the remaining portion of the interpolymer frequently contains from about 30% to about 80% and preferably from about 40% to about 70% by weight of proplyene, the remainder being ethylene.

The form of the invention shown in the drawing involves feeding the polymerization ingredients into a reactor 10 where polymerization takes place. After the polymerization, the unreacted monomers may be flashed off in a tank 11 (where antioxidant may also be added), and the solution of the polymer, or cement, may be agitated with water in a tank 12 to extract the water-soluble catalyst residue. After settling 13 the water layer is removed and the cement is superheated 14 and then pumped under positive displacement pressure, for example by means of a gear pump 15, through an atomizing nozzle 16 or nozzles located in a spray tank 17. As shown, the nozzle 16 is aimed to direct the spray tangentially above the rapidly whirling body 18 of heated water in the tank.

The action is such that the fine droplets of cement in the spray virtually immediately give up almost all of the solvent except for a very small residue which remains in the solid particles. The solid particles quickly fall into or become incorporated in the agitated water 18. In the hot water the tiny solid particles, which are still slightly tacky agglomerate together somewhat to form porous crumbs and give up the remainder of the solvent.

Solvent vapors pass out through an outlet pipe 20 along with water vapor, to a condenser (not shown) for separation and recovery of the solvent.

The water 18 in the spray tank may be heated by directing steam into the water through an inlet pipe 21 extending below the surface of the water. The temperature and pressure in the atmosphere above the water in the spray tank are essentially ambient, that is, the temperature is determined by the heat supplied by the steam and water and by the superheated cement (minus the heat of vaporization absorbed as the solvent flashes off) while the pressure is simply essentially the sum of the vapor pressures of the solvent and water at the temperature prevailing. The pressure will ordinarily be essentially atmospheric pressure.

Discharge of the resultant slurry of solvent-free rubber crumbs and water from the spray tank onto a tray 22 or screen or the like for draining or filtering off of the excess water is followed by a drying operation 23, after which the dry rubber crumbs may be packaged in the usual manner.

The following example will serve to illustrate the practice of the invention in more detail.

*Example*

The following recipe may be used to make a rubbery interpolymer of ethylene, propylene and dicyclopentadiene:

| | |
|---|---|
| Solvent (commercial aliphatic hydrocarbon mixture containing mainly hexane, e.g., "Skellysolve B," boiling point about 147° F.) | 378 lbs. |
| Propylene (initial loading) | 35 lbs. |
| Ethylene (initial loading) | 3.5 lbs. |
| Dicyclopentadiene (20% solution in Skellysolve B) | 7.8 lbs |
| Ethyl aluminum sesquichloride (20% solution in Skellysolve) | 8.12 lbs. |
| Vanadium oxytrichloride | 144 grams. |

The Skellysolve B is dried and added to a 100-gallon reactor blanketed with nitrogen. After the initial loadings of propylene and ethylene have been made, ⅓ of the dicyclopentadiene solution is added. Both the ethyl aluminum sesquichloride and vanadium oxytrichloride are diluted with 50 lbs. of Skellysolve B and ⅓ of each added, in order. At this point the terpolymerization begins. During the additon of the vanadium oxytrichloride the monomer feed (1/1 molar ratio of ethylene/propylene) is started so that the composition of the monomers within the reactor remains fairly constant. After 10 minutes of polymerization 1.25 lbs. of the dicyclopentadiene solution is added. After 25 minutes of polymerization ⅓ of the ethyl aluminum sesquichloride solution, 1.25 lbs. of the dicyclopentadiene solution, and ⅓ of the vanadium oxytrichloride solution are added, in order. After 50 minutes the same addition as at 25 minutes is repeated and then after 90 minutes of polymerization the final amount of dicyclopentadiene, 1.25 lbs. of solution is added.

The total reaction time is 2 hours and the polymerization temperature is 70° F. Final solids for such a run range between 6 and 10%. The polymerization medium is transferred to a flash tank where the excess monomers are removed and the polymerization is stopped by addition of water and/or methanol. An antioxidant is also added at this point. In order to remove as much of the catalyst residues as possible distilled water is added before exposure to air. The water and polymer cement are mixed thoroughly and then allowed to separate. The water layer along with dissolved catalyst residues is withdrawn. The viscosity of the cement varies up to 500,000 cps. at room temperature.

The cement is pre-heated to a temperature of 180° F. in a closed vessel, which results in a pressure of 75–90 lbs. per square inch gauge. The superheated, pressurized cement is forced by means of a gear pump through a spray nozzle (suitably a Spray Engineering Company Model No. 6F spray nozzle) located some distance (e.g., 3–6 feet) above a body of water which is strongly agitated and is maintained at a temperature of about 180° F. The atmosphere above the water into which the spray is directed is essentially at atmospheric pressure. The cement issues from the spray nozzle in the form of discrete droplets (about 0.05 to 0.2 inch in diameter). The major part (about 90%) of the solvent is removed before the droplets of solid polymer fall down into the water. The droplets are still somewhat tacky when they hit the water. Thereafter a number of droplets coalesce in the water to form larger porous particles which can be handled as a slurry. The remainder of the solvent is evaporated while the particles are in the water and the particles then have substantially no further tendency to stick together. Thus, if the agitation ceases the particles will rise to the surface but will redisperse easily.

The resulting final particle of rubber is porous and contains from 30–70% by weight of water occluded throughout the particles. The slurry is filtered over a vibrating screen. The rubber is finally dried by conventional means.

It will be apparent from the foregoing that the invention effectively solves in an economical and convenient manner an important problem in the manufacture and recovery of rubbery polymers prepared by solution polymerization. Unlike certain prior art processes, it is unnecessary in accordance with the invention to attempt to make a dispersion of the cement (polymer solution) in water. The present process further differs from certain prior art practices which depend on processing at or above the melting point of the polymer—such would not be feasible with the rubbers presently used which cannot be melted to a fluid state, at least not without pyrolytic decomposition with consequent ruin of the polymer. Similarly, the invention does not rely upon intense heating to drive out the last traces of solvent; an attempt at such an operation would ultimately pyrolyze the present rubbery polymer.

It is also desired to point out that prior art processes which depend on crystallizing out a polymer at a temperature at which the polymer is sufficiently insoluble to precipitate and form a slurry which is then flashed, are not applicable to the present soluble, amorphous (non-crystalline) rubbery polymers. Certain prior art processes form a three-phase dispersion of precipitated polymer, solvents, and water which is then sprayed into hot water. Such a process is inapplicable to the present non-crystalline rubbers. Such three-phase mixture is sprayed through a two fluid nozzle, whereas the presently employed single phase cement is sprayed through a single nozzle.

Having thus described my invention, what I claim and desire to protect by Letters Patent is:

1. A method of recovering a rubbery polymer from a solution of such polymer in an organic solvent comprising heating the solution to a temperature in excess of the boiling point of the organic solvent while confining the solution under pressure to maintain it in a liquid condition, forcing the solution while in such heated condition as a single phase stream through a spray nozzle directly into a chamber maintained essentially at atmospheric pressure to form the single phase solution into fine droplets from which the bulk of the solvent evaporates thus forming fine particles of solid, tacky rubbery polymer, the said spraying being conducted above the surface of a body of intensely agitated hot water into which the said fine particles of solid tacky rubbery polymer fall, the temperature of the body of water being sufficiently high to drive off the remainder of the solvent, the fine tacky particles agglomerating in the said body of water into porous crumbs, separating the porous crumbs from the water, and drying the crumbs.

2. A method of recovering a rubbery polymer from a solution of such polymer in an organic solvent containing a water-soluble catalyst residue comprising agitating said solution in contact with water to form a two-phase mixture, separating said two-phase mixture into an aqueous phase containing the dissolved catalyst residue and a catalyst-residue-free organic solution phase containing the dissolved rubbery polymer, heating the organic solution to a temperature in excess of the boiling point of the organic solvent while confining the solution under pressure to maintain it in a liquid condition, forcing the solution while in such heated condition as a single phase stream through a spray nozzle directly into a chamber maintained essentially at atmospheric pressure to form the single phase solution into fine droplets from which the bulk of the solvent evaporates thus forming fine particles of solid, tacky rubbery polymer, the said spraying being conducted above the surface of a body of intensely agitated hot water into which the said fine particles of solid tacky rubbery polymer fall, the temperature of the body of water being sufficiently high to drive off the remainder of the solvent, the fine tacky particles agglomerating in the said body of water into porous crumbs, separating the porous crumbs from the water, and drying the crumbs.

3. A method of recovering amorphous, rubbery ethylene-propylene interpolymer from a highly viscous solution of such interpolymer in an organic solvent having a boiling point from 100° to 200° F. comprising superheating the organic solution while confined under pressure to a temperature from 15° to 50° F. higher than the boiling point of the solvent, pumping the solution as a single phase stream under positive pressure through an atomizing nozzle in which the single phase solution is converted into a fine spray in a chamber at atmospheric pressure whereby the bulk of the solvent flashes off leaving behind fine solid particles of rubbery polymer in the atmosphere of said chamber, the said spraying being conducted above the surface of an intensely agitated body of water heated to a temperature above the boiling point of the solvent, the said fine solid particles of rubbery polymer falling into the agitated hot water wherein the remainder of the solvent is driven off and the fine solid particles agglomerate to form porous rubber crumbs, and recovering and drying said porous crumbs.

4. A method of recovering non-crystalline ethylene-propylene-diene terpolymer rubber from a highly viscous solution of such interpolymer in an organic solvent having a boiling point of 100° to 200° F. containing a water-soluble catalyst residue comprising agitating said solution in contact with water to form a two-phase mixture, separating said two-phase mixture into an aqueous phase containing the dissolved catalyst residue and a catalyst-residue-free organic solution phase containing the dissolved rubbery polymer, thereafter superheating the organic solution while confined under pressure to a temperature from 15° to 50° F. higher than the boiling point of the solvent, pumping the solution as a single phase stream under positive pressure through an atomizing nozzle in which the single phase solution is converted into a fine spray of discrete droplets having a diameter of 0.05 to 0.2 inch in a chamber at atmospheric pressure whereby the bulk of the solvent flashes off leaving behind fine solid particles of rubbery polymer in the atmosphere of said chamber, the said spraying being conducted above the surface of an intensely agitated body of water heated to a temperature above the boiling point of the solvent, the said fine solid particles of rubbery polymer falling into the agitated hot water wherein the remainder of the solvent is driven off and the fine solid particles agglomerate to form porous rubber crumbs from ¼ to ½ inch in diameter, and recovering and drying said porous crumbs.

References Cited by the Examiner
UNITED STATES PATENTS

| | | | |
|---|---|---|---|
| 2,561,256 | 7/1951 | Wilson et al. | 260—85.3 |
| 2,957,855 | 10/1960 | McLeod | 260—88.2 |
| 2,957,861 | 10/1960 | Goins | 260—94.9 |
| 2,964,513 | 12/1960 | Dale | 260—94.9 |
| 2,977,351 | 3/1961 | Wiley | 260—94.9 |
| 2,982,763 | 5/1961 | McLeod | 260—94.9 |
| 3,056,772 | 10/1962 | Wallace | 260—94.9 |
| 3,074,923 | 1/1963 | Cosby et al. | 260—94.9 |

NORMAN YUDKOFF, *Primary Examiner.*